No. 715,778. Patented Dec. 16, 1902.
H. A. FRASCH.
PROCESS OF CONCENTRATING GASES.
(Application filed Apr. 29, 1899.)
(No Model.)
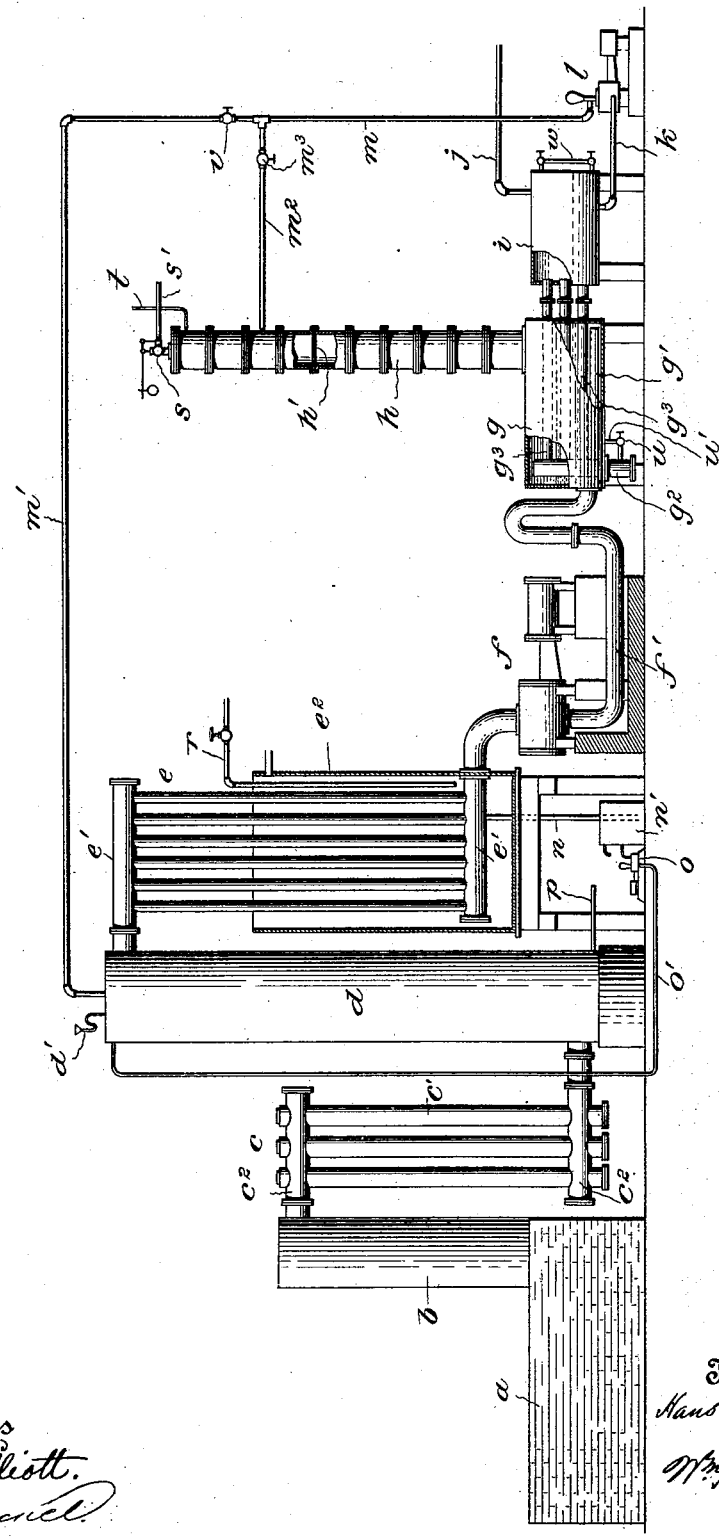

UNITED STATES PATENT OFFICE.

HANS A. FRASCH, OF NEW YORK, N. Y.

PROCESS OF CONCENTRATING GASES.

SPECIFICATION forming part of Letters Patent No. 715,778, dated December 16, 1902.

Application filed April 29, 1899. Serial No. 715,038. (No specimens.)

*To all whom it may concern:*

Be it known that I, HANS A. FRASCH, a citizen of the United States, residing at New York, in the county of New York and State of New York, have invented a certain new and useful Improvement in Processes of Concentrating Gases, of which the following is a full, clear, and exact description.

The object of this invention is to provide for the concentration of sulfur dioxid for the manufacture of anhydrous sulfurous acid or sulfuric acid or sulfuric anhydrid or any other purpose for which sulfurous acid or sulfur dioxid can be used.

In burning sulfur or pyrites owing to the limited quantity of oxygen present in the air the richest gas obtainable contains only about eleven per cent. of sulfur dioxid, the remainder being largely, if not wholly, the nitrogen of the air, so that, for instance, in sulfuric-acid making practically nine-tenths of the apparatus are filled with inert gases, which retard reaction and occupy space in the lead-chambers which otherwise might be utilized to better advantage if the sulfurous-acid gas or sulfur dioxid were more concentrated. For the manufacture of sulfuric anhydrid especially it is desirable to operate with highly-concentrated sulfur dioxid.

It has been proposed heretofore to absorb sulfur dioxid in water at atmospheric pressure and then expel the gas by boiling; but this process requires large quantities of water and heat, and the plant for carrying out the process is very expensive to construct and operate.

My invention consists in concentrating sulfur dioxid by surcharging under pressure a solution of the gas previously saturated under atmospheric pressure and removing the pressure, thereby evaporating the surcharged quantity of sulfur dioxid and using the remaining solution to be again surcharged, and since water absorbs a much larger quantity of sulfur dioxid under pressure than it will under atmospheric conditions the excess which it has dissolved or absorbed under pressure will of itself evaporate when the pressure is removed.

Having thus stated the principle of my invention, I will proceed now to set forth the best mode in which I have contemplated applying that principle and then will particularly point out and distinctly claim the improvement which I claim as my invention.

In the accompanying drawing I have shown, partly in section and partly in elevation, one form of plant or apparatus by which my said invention may be carried into effect.

I will describe first the apparatus illustrated in the drawing and then set forth the process carried out with reference to such apparatus without thereby being understood as limiting my invention to details.

The letter $a$ indicates a sulfur-burner; $b$, a dust-chamber; $c$, an air-cooler. The cooler $c$ is composed of the vertical pipes $c'$ and the headers or manifolds $c^2$, and being exposed to atmospheric influences I refer to it as the "air-cooler."

$d$ is a cooling-tower or scrubber, which may be constructed as the well-known Glover tower. A series of vertical pipes $e$, arranged in headers or manifolds $e'$ $e'$, are supported in a water-tank $e^2$, all of which constitute a final cooling apparatus.

$f$ is a compressor of any approved construction interposed between the cooler last described and an absorber, which latter consists of a cylindrical vessel $g$, having extended over its bottom a perforated pipe or false bottom $g'$, through which the gases enter and are forced through the body of water contained in the vessel. Arranged within the absorber or saturator is an expander composed of the header or manifold $g^2$ and the pipes $g^3$, fitted thereto. Above the absorber is erected a column $h$, composed of a series of sections, between the joints of which are placed perforated plates $h'$.

$i$ is a collecting vessel or collector, into which open the pipes $g^3$ of the expander. These pipes $g^3$ conduct the evaporating solution and gas to the collector, from which the escaping gases are conducted through pipe $j$, the remaining solution being pumped through pipe $k$, pump $l$, and pipes $m$ $m'$ back to either the absorbing-column $h$ or the scrubber $d$. The condense-water that may collect in the header $e'$ escapes through pipe $m$ into a tank $n'$, and thence it is drawn by a pump $o$ and forced through pipe $o'$ into the tower $d$, such condense-water containing a portion of sulfur dioxid.

$p$ is a pipe which serves as an outlet to drain the tower $d$.

The various parts of the apparatus are connected by pipes, substantially as shown and as I will proceed to point out more particularly.

To carry out my invention, the sulfur-dioxid gas passes from the burner $a$ through the dust-chamber $b$ to the air-cooler $c$ and thence to the tower $d$. The tower $d$ is served with a small flow of water by the intake $d'$ for the purpose of cooling and scrubbing the gas. This wash-water may go to waste through the pipe $p$, or it may be cooled after leaving that pipe and be returned to the tower in any suitable manner. For instance, the said pipe $p$ may empty into the tank $n'$ and the water therein cooled and thence returned by pump $o$ through pipe $o'$ to the said tower $d$. The gas passes from the top of the tower $d$ into the upper manifold $e'$ and thence into the pipes $e$, where it is exposed to the cooling effect of the water in the surrounding tank $e^2$. The water may be supplied to this tank through pipe $r$ or in any suitable way, and any suitable provision may be made for circulating the water therein or renewing it, if desired. The gas is completely cooled in this last-mentioned cooler, and then it is drawn from the said cooler through the lower header or manifold $e'$ into the compressor $f$, whence it is forced through pipe $f'$ into the absorber, rising thence into the column $h$, where it is kept under any desired pressure by the back-pressure valve $s$. I prefer to use about twenty pounds pressure; but any suitable degree of pressure may be employed. The absorber is primarily filled about half-full of water, the water being delivered into the top of the column $h$ through a pipe $t$ and by means of a pump (not shown) or other suitable medium. The water in its descent through the column $h$ dissolves or absorbs whatever sulfur dioxid has escaped the absorber. When once the contents of the absorber have been brought to saturation at the existing pressure, the valve $u$ in pipe $u'$, leading from the absorber vessel to the header $g^2$ of the expander, is opened to allow the oversaturated liquid to escape into the header or manifold $g^2$ and thence through the pipes $g'$ into the collecting vessel $i$, and since the expanding vessel and connecting-pipes and manifold are under atmospheric pressure all of the sulfur dioxid with which the water has been surcharged in the absorber will evaporate, and this then is conducted through the pipe $j$ to any suitable receptacle or to a place where it is to be utilized. The gases which are not soluble in water, or, better, which have not been absorbed in the absorber and the column $h$, pass into the atmosphere through the valve $s$ and pipe $s'$. Since the absorbing and collecting vessels are connected by the pipes $g^3$ and the expansion takes place principally in the header $g^2$, the cooling effect (heat absorbed) in such expansion neutralizes the heat liberated by the compression and keeps cool the absorbing liquid. The water after expansion still contains about nine per cent. of sulfur dioxid—that is to say, the water is saturated at atmospheric pressure. This solution is returned to the column $h$ by the pump $l$ through the pipes $m'$ and $m^2$ to be again surcharged. The water-inflow into the column $h$ is then reduced to a very slight stream. The normal levels of sulfur-dioxid solution in the vessels $g$ and $i$ are indicated by the dotted lines. Now if no water were added in the absorbing-column $h$ the contents of the vessel $i$ would simply be constantly pumped back through the pipe $m$ into the column to be again surcharged; but to avoid possible loss of sulfur dioxid which might escape the column unabsorbed I maintain a constant though small stream of fresh water passing into the column $h$, and this increases the quantity of solution contained in the absorber and eventually in the vessel $i$; but under this operation both the absorber and the vessel $i$ would in course of time fill up with the solution, and in order to overcome this difficulty a proportional amount of sulfur-dioxid solution (after it has given off its surcharge) is permitted to pass through the valve $v$ and pipe $m'$ to the tower $d$, where the solution meets the hot ascending gases and gives off the sulfur dioxid yet contained in it. The quantity of sulfur-dioxid solution thus passed from the vessel $i$ to the tower $d$ corresponds to the quantity of fresh water added through the absorbing column $h$ and the absorber. In this connection the vessel $i$ is provided with a glass gage $w$, and whenever a few inches have accumulated in the said vessel above the normal level the valve $v$ is partly opened, and the pump $l$ is quickened until the surplus is removed to the tower $d$. Since the absorber is under pressure, the solution will pass on to the tower $d$ as soon as the valve $v$ is opened A constant quantity of sulfur-dioxid solution, corresponding to the increase of the solution in the vessel $i$, may be allowed to escape by properly regulating the valve $v$, while at the same time the bulk of the solution delivered by the pump $l$ may go to the absorbing-column $h$.

The pipe $m^2$ is provided with the valve $m^3$, by which communication between column $h$ and the pipe $m$ is controlled.

What I claim is—

1. The method of recovering sulfur dioxid, which consists in passing gases containing sulfur dioxid under pressure through a saturated solution of sulfur dioxid, then washing the gases under pressure with fresh water, reducing the surcharged solution thereby obtained to atmospheric pressure when the surcharged amount of sulfur dioxid evaporates, and returning the surplus solution of sulfur dioxid accumulating by the introduction of the fresh water to an evaporating apparatus where it is exposed to heat and the evaporated sulfur dioxid is returned to the absorber, substantially as described.

2. The method of concentrating sulfur dioxid, which consists in cooling the gas containing sulfur dioxid by direct contact with water, then subjecting it to pressure and absorbing it under pressure in a solution, previously saturated with sulfur dioxid under atmospheric pressure, and finally washing it with fresh water, reducing the surcharged solution thereby obtained to atmospheric pressure, whereby the surcharged amount of sulfur dioxid evaporates, and using the remaining saturated solution to be again surcharged, substantially as described.

In testimony whereof I have hereunto set my hand this 25th day of April, A. D. 1899.

HANS A. FRASCH.

Witnesses:
CHARLES BURKHARTER,
GEORGE F. KENNA.